US012800759B2

(12) United States Patent
Chakraborty et al.

(10) Patent No.: US 12,800,759 B2
(45) Date of Patent: Nov. 17, 2026

(54) SENSING DEVICE FIXING UNIT FOR AN INDUSTRIAL VEHICLE

(71) Applicant: Volvo Truck Corporation, Gothenburg (SE)

(72) Inventors: Pinka Chakraborty, Bangalore (IN); Balakrishnan Ramu, Bangalore (IN); Öystein Berg, Torslanda (SE)

(73) Assignee: Volvo Truck Corporation, Gothenburg (SE)

( * ) Notice: Subject to any disclaimer, the term of this patent is extended or adjusted under 35 U.S.C. 154(b) by 303 days.

(21) Appl. No.: 18/636,474

(22) Filed: Apr. 16, 2024

(65) Prior Publication Data

US 2024/0369699 A1 Nov. 7, 2024

(30) Foreign Application Priority Data

May 3, 2023 (EP) .................................... 23171238

(51) Int. Cl.

*G01S 13/931* (2020.01)
*B60R 19/48* (2006.01)
*G01S 7/02* (2006.01)
*G01S 13/86* (2006.01)

(52) U.S. Cl.

CPC .......... *G01S 13/931* (2013.01); *B60R 19/483* (2013.01); *G01S 7/027* (2021.05); *G01S 13/86* (2013.01); *G01S 2013/93271* (2020.01)

(58) Field of Classification Search

CPC ........ G01S 13/931; G01S 7/027; G01S 13/86; G01S 2013/93271; G01S 2013/93275; G01S 2013/9327; G01S 2013/93272; G01S 2013/93273; G01S 2013/93274; G01S 2013/93276; G01S 2013/9314; G01S 7/4813; G01S 17/88; G01S 17/93; G01S 17/931; G01S 17/933; B60R 19/483; F16B 5/06; F16B 5/0621; F16B 5/0642; F16B 5/065; F16B 5/0664; F16B 5/0657; F16B 5/10; H01Q 1/3233; H01R 13/5213

USPC .................................. 248/349.1; 403/DIG. 1

See application file for complete search history.

(56) References Cited

U.S. PATENT DOCUMENTS

| | | | | |
|---|---|---|---|---|
| 7,200,903 | B2 * | 4/2007 | Shaw | B65G 1/023 24/453 |
| 7,734,171 | B2 * | 6/2010 | Leonelli, Jr. | H04N 23/54 348/374 |
| 11,621,478 | B2 * | 4/2023 | Kim | H01Q 1/3291 342/70 |

(Continued)

FOREIGN PATENT DOCUMENTS

KR 20200044301 A 4/2020

OTHER PUBLICATIONS

European Search Report for European Patent Application No. 23171238.1, completed Oct. 19, 2023, 2 pages.

*Primary Examiner* — Ingrid M Weinhold
(74) *Attorney, Agent, or Firm* — Withrow & Terranova, PLLC

(57) ABSTRACT

A fixing unit for fixing a sensing device to an industrial vehicle, the fixing unit comprising a first bracket, a second bracket comprising a plurality of fixing lugs configured for snap engagement with the first bracket, a plurality of retaining pins configured for passing through the sensing device, in which the sensing device is pressed between the first bracket and the second bracket when the fixing lugs of the second bracket are locked in the first bracket.

17 Claims, 7 Drawing Sheets

(56) References Cited

U.S. PATENT DOCUMENTS

| | | | | |
|---|---|---|---|---|
| 12,092,260 | B2 * | 9/2024 | Kim | F16M 13/02 |
| 12,246,652 | B2 * | 3/2025 | Nakayama | B60R 13/04 |
| 12,523,766 | B2 * | 1/2026 | Mori | G01S 7/027 |
| 2003/0094828 | A1 * | 5/2003 | Nagamoto | B60R 13/0206 296/39.1 |
| 2004/0239574 | A1 | 12/2004 | Zeiher et al. | |
| 2014/0111950 | A1 * | 4/2014 | Yamasaki | B60R 16/0239 361/747 |
| 2015/0250072 | A1 * | 9/2015 | Ichikawa | H01R 13/5213 439/587 |
| 2016/0040700 | A1 * | 2/2016 | Trojanowski | F16B 5/0628 29/592 |
| 2020/0361398 | A1 | 11/2020 | Nakajima et al. | |
| 2021/0057808 | A1 * | 2/2021 | Kim | H01Q 1/3291 |
| 2022/0196831 | A1 * | 6/2022 | Hong | G01S 13/931 |
| 2023/0202404 | A1 * | 6/2023 | Nakayama | G01S 7/027 296/1.08 |
| 2023/0280444 | A1 * | 9/2023 | Mori | G01S 7/027 342/70 |
| 2024/0369699 | A1 * | 11/2024 | Chakraborty | B60R 19/483 |

* cited by examiner

SENSING DEVICE FIXING UNIT FOR AN INDUSTRIAL VEHICLE

PRIORITY APPLICATIONS

This present application claims priority to European Patent Application No. 23171238.1, filed on May 3, 2023, and entitled "SENSING DEVICE FIXING UNIT FOR AN INDUSTRIAL VEHICLE," which is incorporated herein by reference in its entirety.

TECHNICAL FIELD

This disclosure relates to the field of environment sensing devices, and more particularly to a fixing unit for fixing a sensing device to an industrial vehicle.

BACKGROUND ART

In order to improve vehicle safety and provide assistance to the driver, motor vehicles can be equipped with one or more sensing devices for sensing the environment of the vehicle, and detecting objects. Such a sensing device can be for example a radar, or a lidar. A radar is usually installed at the front of the vehicle and emits electromagnetic waves towards the front of the vehicle. The radar also receives the waves reflected by objects or people present in the coverage area of the radar. Signal processing of emitted waves and reflected waves enables to detect objects present in the environment of the vehicle and warning signals can be provided to the driver.

The mechanical installation of a radar must meet different requirements. In order to guarantee a good accuracy, the space orientation of the radar relatively to the vehicle must remain constant. The radar mounting system must therefore be relatively rigid. In addition, the radar is subject to the shocks and vibrations received by the vehicle or generated by it. When the radar is installed on an industrial vehicle, such as a truck, the level of vibrations and shocks received can be much higher than when the same equipment is fitted on a road car. Consequently, a standard component developed for a passenger car environment may experience reliability issue when it is implemented on an industrial vehicle.

There is thus a need to have a system for fixing a detection sensor that guarantees a proper operation of the detection sensor, while allowing a quick and easy installation.

SUMMARY

To this end, it is proposed a fixing unit for fixing a sensing device to an industrial vehicle, the fixing unit comprising:

- a first bracket,
- a second bracket comprising:
  - a plurality of fixing lugs configured for snap engagement with the first bracket,
  - a plurality of retaining pins configured for passing through the sensing device, in which the sensing device is pressed between the first bracket and the second bracket when the fixing lugs of the second bracket are locked in the first bracket.

The fixing unit can then be fixed to the vehicle. The mechanical constraints associated with the fixing on the vehicle are supported by the fixing unit, and not by the sensing device itself. Furthermore, the fixing unit can play the role of an interface part which filters out part of the vibrations and shocks experienced by the vehicle. The sensing device is thus less stressed, which is particularly beneficial when the driving conditions are rough. The fixing unit also protects the sensing device during the installation on the industrial vehicle.

The following features can optionally be implemented, separately or in combination one with the others:

In the meaning of the present disclosure, the sensing device is a vehicle environment sensing device.

In an embodiment the sensing device is a radar. In a variant, the sensing device can be a lidar. In another variant, the sensing device can be a camera, for example a time-of-flight camera.

According to an aspect of the disclosure, the plurality of retaining pins is configured for passing through holes of the sensing device.

The first bracket and the second bracket are stacked one over the other.

The sensing device can be inserted between the two brackets before they are attached to each other by snap fit. The sensing device is clamped between the two brackets once the two brackets are fixed together by snap fit.

In an embodiment, the fixing lugs are of the cantilever type.

The fixing lugs have the general shape of a cantilever beam ending by a hook.

The cross section of the beam is for example rectangular.

The first bracket comprises engagement holes in which the fixing lugs can engage.

In an embodiment, the first bracket is made of plastic material.

The first bracket is formed as a frame.

In an embodiment, the second bracket is made of plastic material.

In an embodiment of the fixing unit, the retaining pins are configured to pass through the sensing device when the fixing lugs of the second bracket are engaged in the first bracket.

The retaining pins allow an accurate positioning of the sensing device in the fixing unit.

The sensing device comprises a plurality of mounting tabs, each mounting tab comprising a hole. A retaining pin passes through the hole in each mounting tab.

The mounting tabs are sandwiched between the first bracket and the second bracket when the sensing device is fixed in the fixing unit.

In an embodiment of the fixing unit, the plurality of fixing lugs comprises pairs of fixings lugs, each fixing lug of a pair of fixing lugs facing the other fixing lug of the pair of fixing lugs.

An arrangement with pairs of fixing lugs provides a strong assembly and an easy insertion of the second bracket in the first bracket.

The two fixing lugs of a pair of fixing lugs are arranged symmetrically with respect to each other.

According to an embodiment of the fixing unit, a retaining pin is disposed between the two fixing lugs of a pair of fixing lugs.

The retaining pin secures the sensing device on the second bracket which makes the assembly process easier.

In an example of implementation, the two fixing lugs of a pair of fixing lugs are arranged symmetrically with respect to an axis of extension of a retaining pin.

A first fixing lug of a pair of fixing lugs extends along a first axis, a second fixing lug of the same pair of fixing lugs extends along a second axis, the first axis and the second axis make an angle comprised between 0° et 10°.

According to an aspect of the disclosure, the fixing unit is configured for being fixed to the industrial vehicle.

The fixing unit is configured for being fixed to a sub-frame of the industrial vehicle.

For example, the fixing unit can be bolted to a sub-frame of the industrial vehicle.

The sub-frame of the vehicle can be a metal bracket. The metal bracket can be assembled to a structural element of the industrial vehicle.

In an embodiment of the fixing unit, the first bracket comprises a plurality of mounting holes configured for receiving threaded fixing means.

In an embodiment of the fixing unit, the second bracket comprises a plurality of mounting holes configured for receiving threaded fixing means.

The mounting holes of the first bracket are aligned with the mounting holes of the second bracket.

In an example of implementation, the threaded fixing means may be a screw configured for engaging in a sub-frame of the vehicle.

In another example of implementation, the threaded fixing means may be a threaded rod engaging into a structural element of the vehicle and configured for receiving a nut.

In an embodiment, the first bracket comprises a sleeve bordering a mounting hole.

Preferably, each mounting hole of the first bracket is bordered by a sleeve.

In an embodiment, the second bracket comprises a sleeve bordering a mounting hole.

Preferably, each mounting hole of the second bracket is bordered by a sleeve.

The sleeves are in metal.

The sleeves of the first bracket are coaxial with the sleeves of the second bracket.

An axial end of a sleeve of the first bracket is in contact with an axial end of a sleeve of the second bracket.

The sleeves are axially compressed when the threaded fixation means are torqued.

The sleeves avoid putting excessive stress in the plastic part of the first and the second bracket.

In an embodiment of the fixing unit, the retaining pins are split.

In this embodiment, the retaining pins are configured for being elastically deformed in a radial direction when the sensing device is fixed in the fixing unit.

The retaining pins are thus configured for generating a radial constraint against the lateral surface of the holes of the mounting tabs of the sensing device. Therefore, some of the energy of the vibrations received by the sensing device is transferred to the fixing unit through the second bracket.

In a particular embodiment, the retaining pin is split according to two transverse directions.

The first bracket may comprise a first supporting beam for a connector plugged to the sensing device.

Similarly, the second bracket may comprise a second supporting beam for the connector plugged to the sensing device.

In an embodiment, the first supporting beam comprises an opening configured for receiving a portion of the connector plugged to the sensing device.

The connector is thus held in place, and the risk of accidental unplugging of the connector is eliminated.

The sides of the opening are in contact with the connector.

In an embodiment, the second bracket comprises locating pins configured for being inserted in a subframe of the industrial vehicle.

The disclosure also relates to an assembly comprising a sensing device and a fixing unit as described before.

The disclosure refers as well to an industrial vehicle comprising a fixing unit as already described, or comprising an assembly as mentioned above, in which a sensing device is fixed to a front part of the industrial vehicle by the fixing unit and in which the sensing device senses the environment of the industrial vehicle.

The industrial vehicle is a truck, for example a porter truck or a long-haul truck.

The front part is a transverse front beam of the industrial vehicle.

An emission direction of the sensing device coincides with a longitudinal axis of the industrial vehicle.

The assembly of the sensing device and the fixing unit is protected by a cover.

The cover is for example formed by a bulged portion of a vehicle grille.

BRIEF DESCRIPTION OF DRAWINGS

Other features, details and advantages will be shown in the following detailed description and on the figures, on which.

DETAILED DESCRIPTION

In order to make the figures easier to read, the various elements are not necessarily represented to scale. In these figures, identical elements receive the same reference number. Certain elements or parameters can be indexed, that is to say designated for example by 'first element' or second element, or first parameter and second parameter, etc. The purpose of this indexing is to differentiate elements or parameters that are similar, but not identical. This indexing does not imply a priority of one element, or one parameter over another, and their names can be interchanged. When it is mentioned that a subsystem comprises a given element, the presence of other elements in this subsystem is not excluded.

Figure 1:
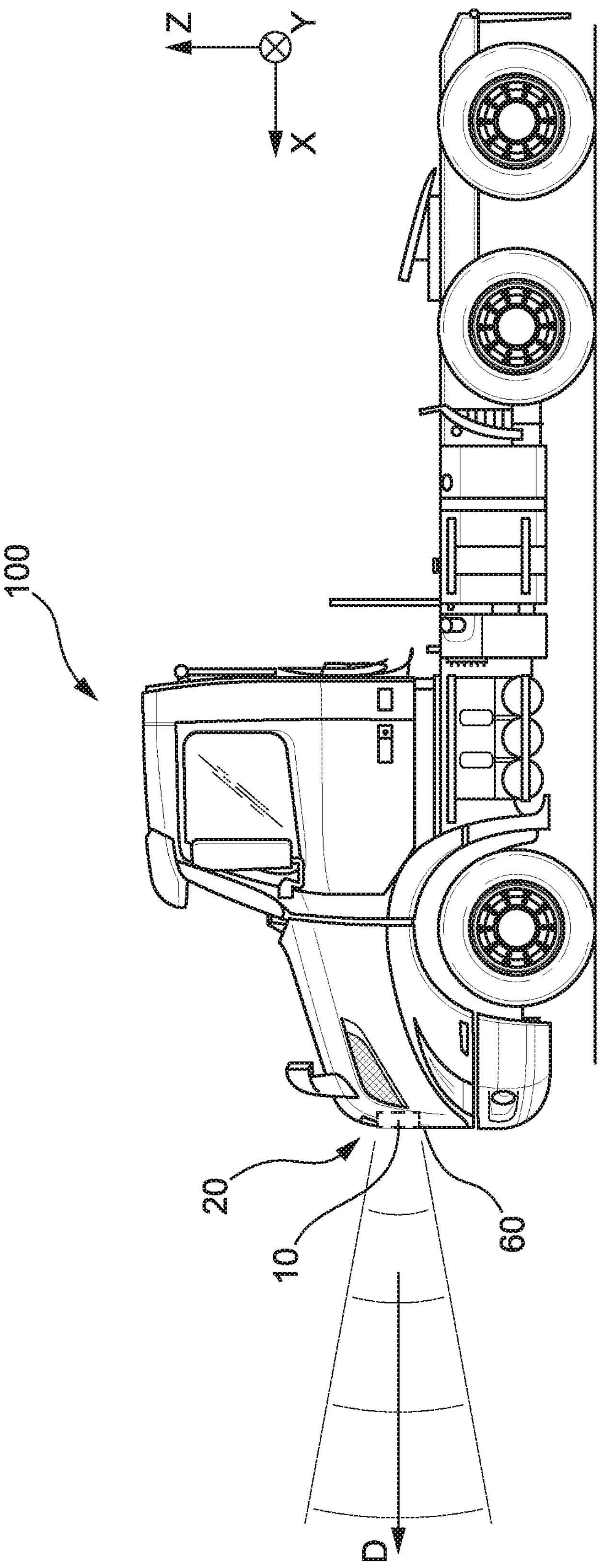
FIG. 1 is a side view of an industrial vehicle equipped with a fixing unit according to an embodiment of the invention.

FIG. 1 illustrates an industrial vehicle 100. The industrial vehicle 100 is a truck, more precisely a long-haul truck. It could also be a porter truck. The present disclosure can also be applied to other types of industrial vehicles, such as a construction truck, or a bus.

Figure 2:
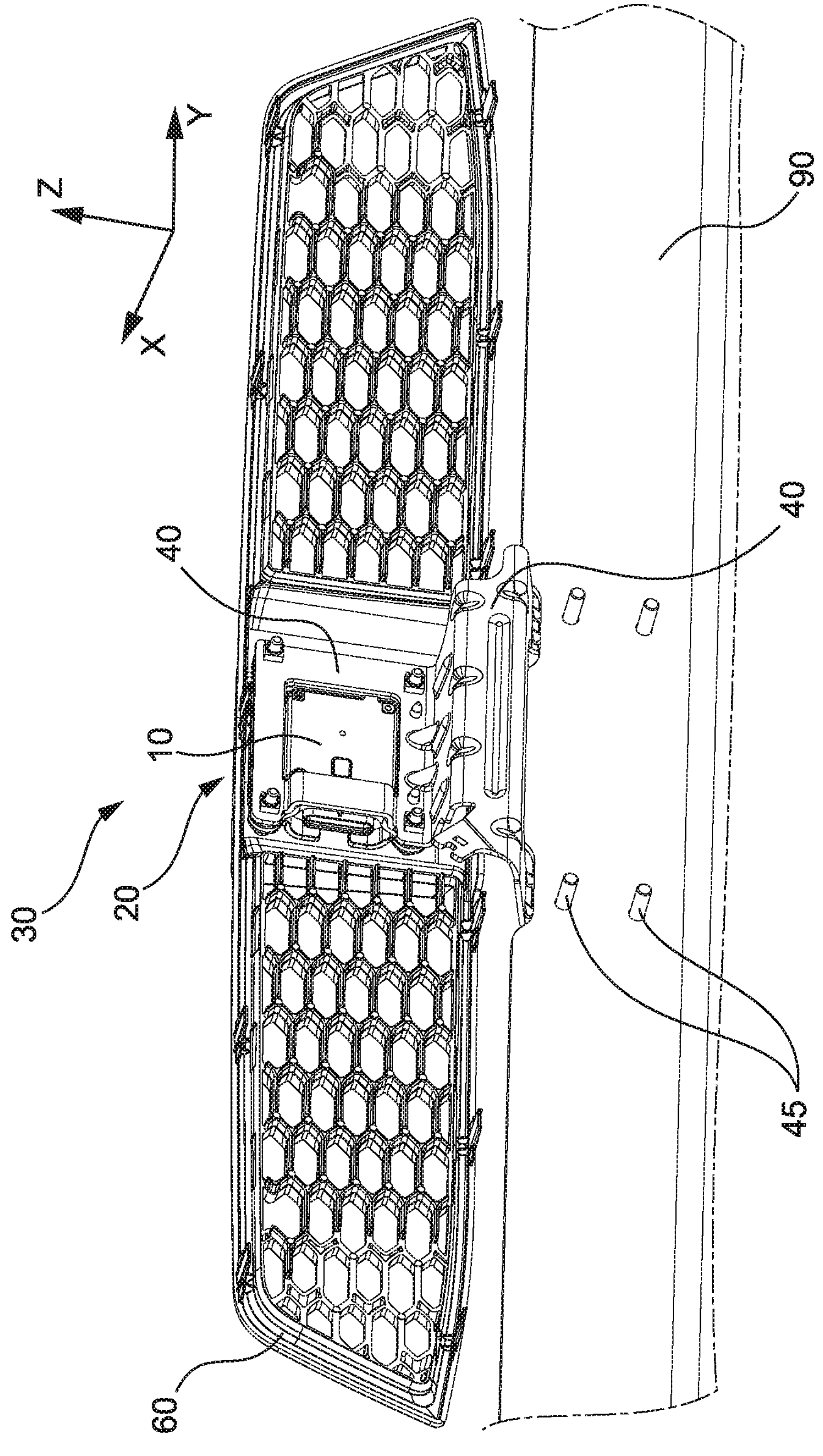
FIG. 2 is a perspective view of an assembly comprising the fixing unit of FIG. 1.

The industrial vehicle 100 comprises a sensing device 10. The sensing device 10 is fixed to a front part of the industrial vehicle 100 by a fixing unit 20 that will be described in detail below. The sensing device 10 senses the environment of the industrial vehicle 100. The front part, as represented on FIG. 2, is in the illustrated example a transverse front beam 90 of the industrial vehicle 100.

In the meaning of the present disclosure, the sensing device 10 is a vehicle environment sensing device. The sensing device 10 is configured for sensing the environment of the vehicle 100 in order to detect objects located in a field of view of the sensing device 10. A driver assistance system processes the data captured by the sensing device 10 and can indicate the position of the detected obstacles. Warning signals can be generated so that the driver reacts accordingly.

In the illustrated embodiment, the sensing device 10 is a radar. An emission direction D of the sensing device 10 coincides on FIG. 1 with a longitudinal axis X of the industrial vehicle 100.

In a variant, the sensing device 10 can be a lidar. In another variant, the sensing device 10 can be a camera, for example a time-of-flight camera. (ToF)

The industrial vehicle 100 comprises an assembly 30 of a sensing device 10 and a fixing unit 20.

The fixing unit 20 that will be described in detail below.

FIG. 2 illustrates an assembly 30 comprising a sensing device 10 and a fixing unit 20. The assembly 30 is fixed to the truck 100. For clarity, only the front grille 60 and the transverse front beam 90 have been represented, and the other mechanical elements have been omitted.

The assembly 30 of the sensing device 10 and the fixing unit 20 is protected by a cover. The cover is for example formed by a bulged portion of the vehicle grille 60. The sensing device 10 is thus located at the front of the vehicle 100 and has a clear, non-obstructed, field of view. The cover offers protection from weather elements, road debris and the like. The cover is permeable to electromagnetic waves so that emitted waves can travel through the cover, and waves reflected by obstacles can also pass through the cover and reach the sensing device 10.

The fixing unit 20 for fixing a sensing device 10 to an industrial vehicle 100 comprises:

- a first bracket 1,
- a second bracket 2 comprising:
  - a plurality of fixing lugs 3 configured for snap engagement with the first bracket 1,
  - a plurality of retaining pins 4 configured for passing through the sensing device 10.

The sensing device 10 is pressed between the first bracket 1 and the second bracket 2 when the fixing lugs 3 of the second bracket 2 are locked in the first bracket 1.

In other words, the second bracket 2 comprises a plurality of retains pins 4 that pass through the sensing device 10 and a plurality of fixing lugs 3 that are snap fitted in the first bracket 1. The sensing device 10 may be in direct contact with the first bracket 1 and the second bracket 2, as it is the case in the illustrated example.

The fixing unit 20 can be fixed to the vehicle 100. The fixing unit 20 is an interface part between the sensing device 10 and the structure of the vehicle. The mechanical constraints associated with the fixing of the sensing device 10 to the vehicle 100 are thus supported by the fixing unit 20, and not by the sensing device 10 itself. Furthermore, the fixing unit 20 can filter out at least some of the vibrations and shocks experienced by the vehicle 100. The fixing unit 20 also protects the sensing device 10 during its installation on the industrial vehicle 100, since it prevents direct contact between the sensing device and environment. For example, a dropped tool is less likely to come into contact with the sensing device 10 since the two brackets 1, 2 offer protection.

Figure 4:
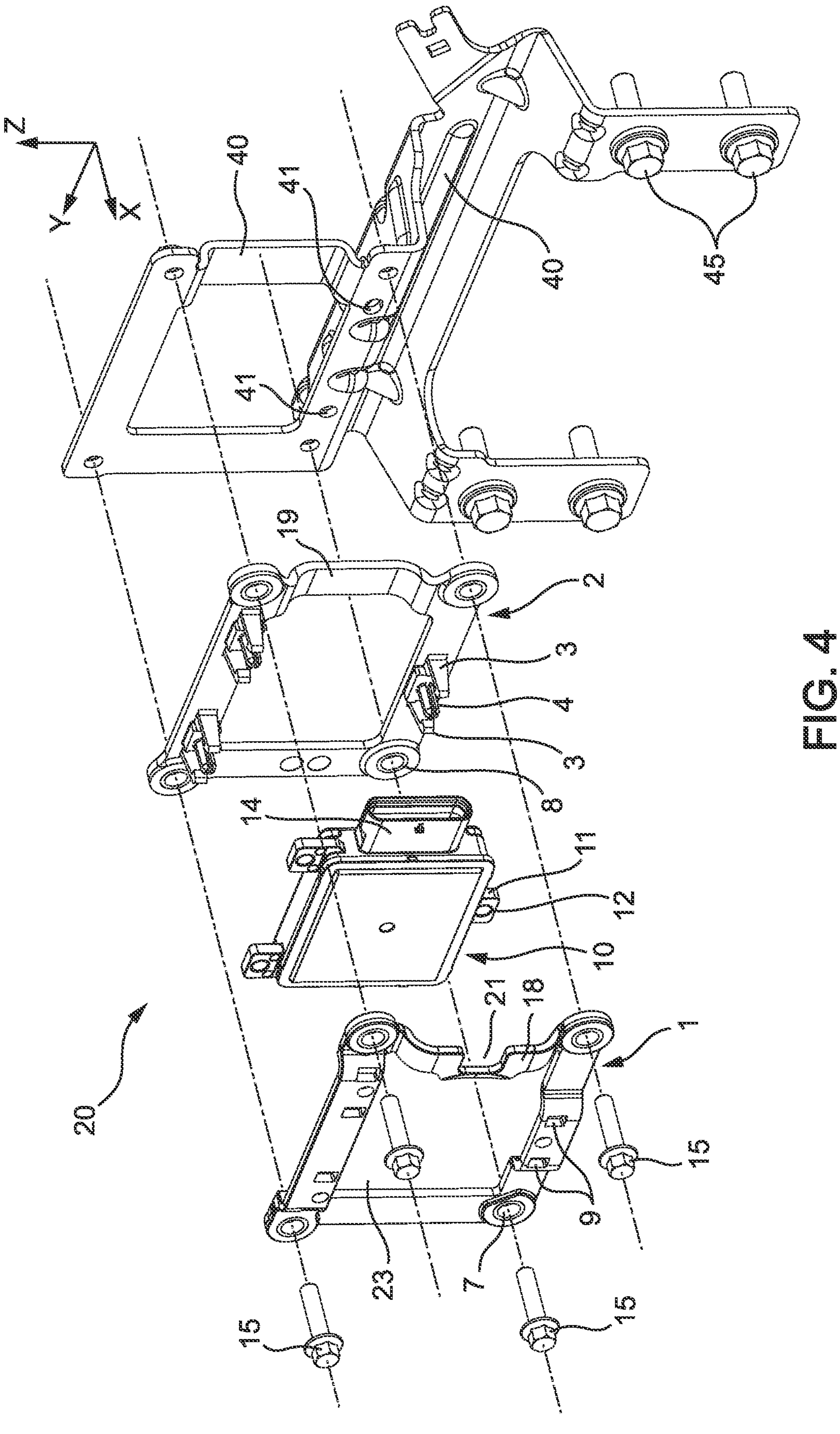
FIG. 4 is an exploded view of the fixing unit of FIGS. 2 and 3.

FIG. 4 is an exploded view of a fixing unit 20 with a sensing device 10.

The first bracket 1 is formed as a frame. The first bracket 1 has the general shape of a frame. The first bracket 1 is made of plastic material. Similarly, the second bracket 2 is formed as a frame. The second bracket 2 is also made of plastic material. Both brackets 1, 2 have a rectangular external shape with a rectangular opening.

The first bracket 1 comprises an opening 23 through which electromagnetic waves emitted by the sensing device can travel, and through which the electromagnetic waves reflected by the environment can reach the sensing device 10. The opening 23 of the first bracket 1 is approximately rectangular.

The first bracket 1 and the second bracket 2 are stacked one over the other. The sensing device 10 can be inserted between the two brackets 1,2 before they are attached to each other by snap fit. The sensing device 10 is clamped between the two brackets 1,2 once the two brackets are fixed together by snap fit. In other words, the sensing device 10 is sandwiched between the two brackets 1, 2 when the two brackets 1, 2 are engaged one with the other. The plurality of retaining pins 4 is configured for passing through holes 12 of the sensing device.

Figure 7:
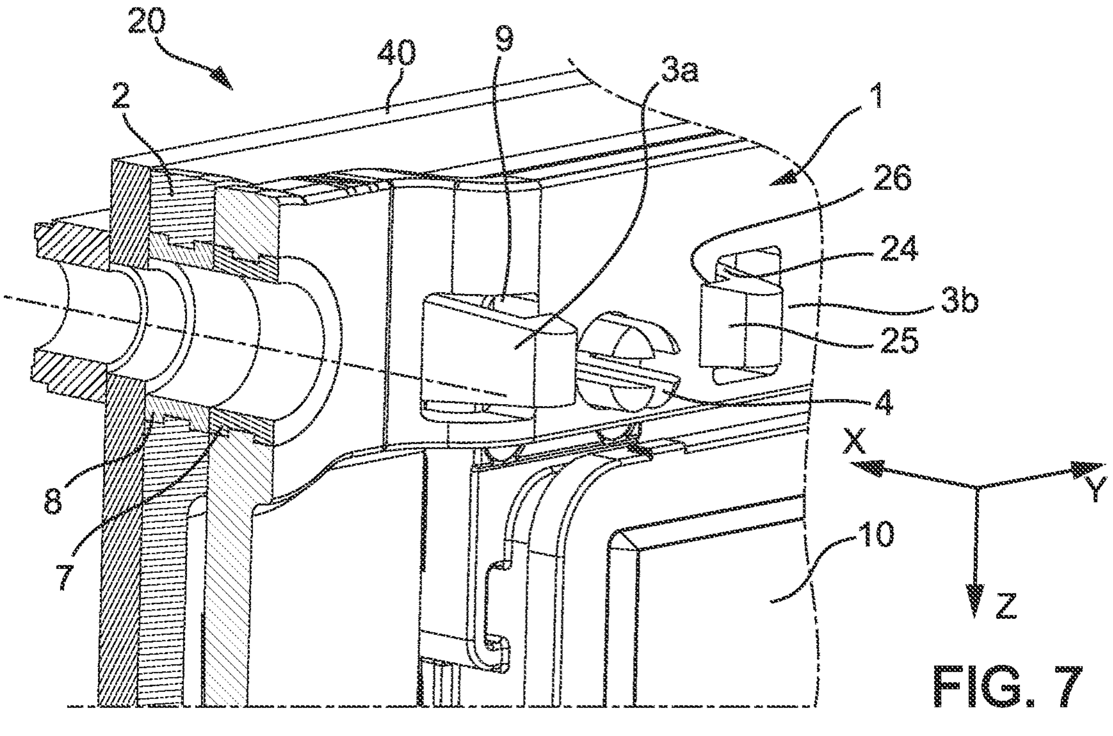
FIG. 7 is a sectioned view of the fixing unit of FIG. 5.
Figure 8:
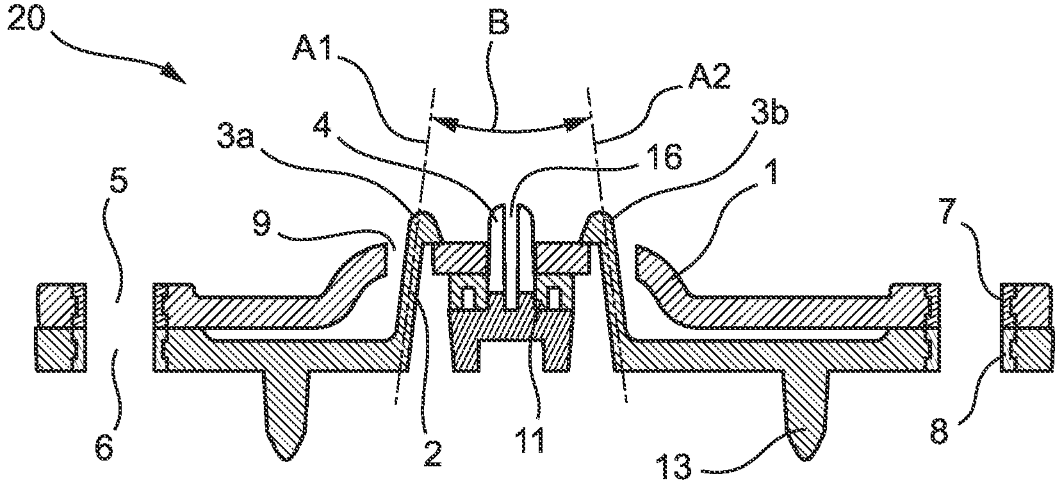
FIG. 8 is another sectioned view of the fixing unit of FIG. 5.
Figure 9:
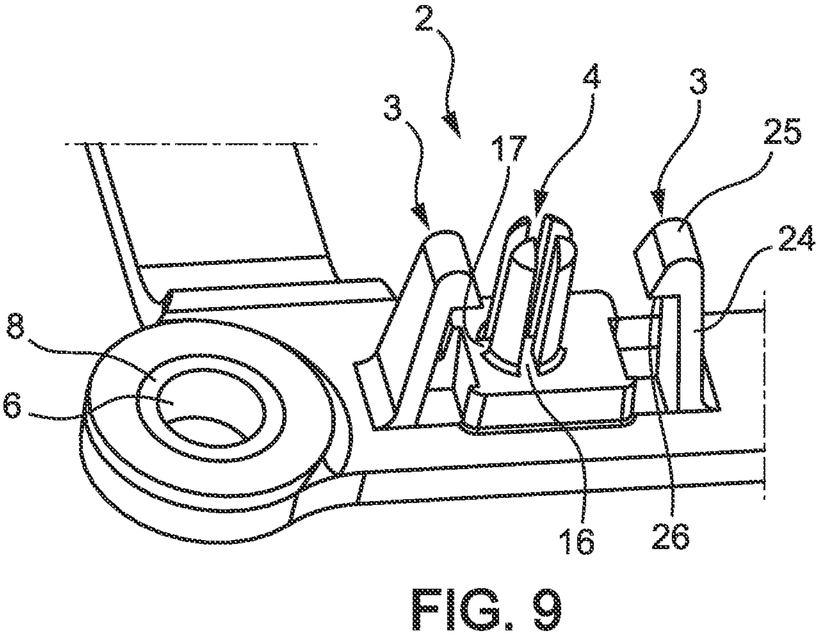
FIG. 9 is a detailed view of a bracket comprised in the fixing unit.

On the example illustrated on FIGS. 3 to 9, the fixing lugs 3 are of the cantilever type. FIG. 9 illustrates the second bracket 2 in isolation from the other parts. As detailed on this figure; the fixing lugs 3 have the general shape of a cantilever beam 24 ending by a hook 25. The cross section of the beam 24 is here rectangular.

Figure 6:
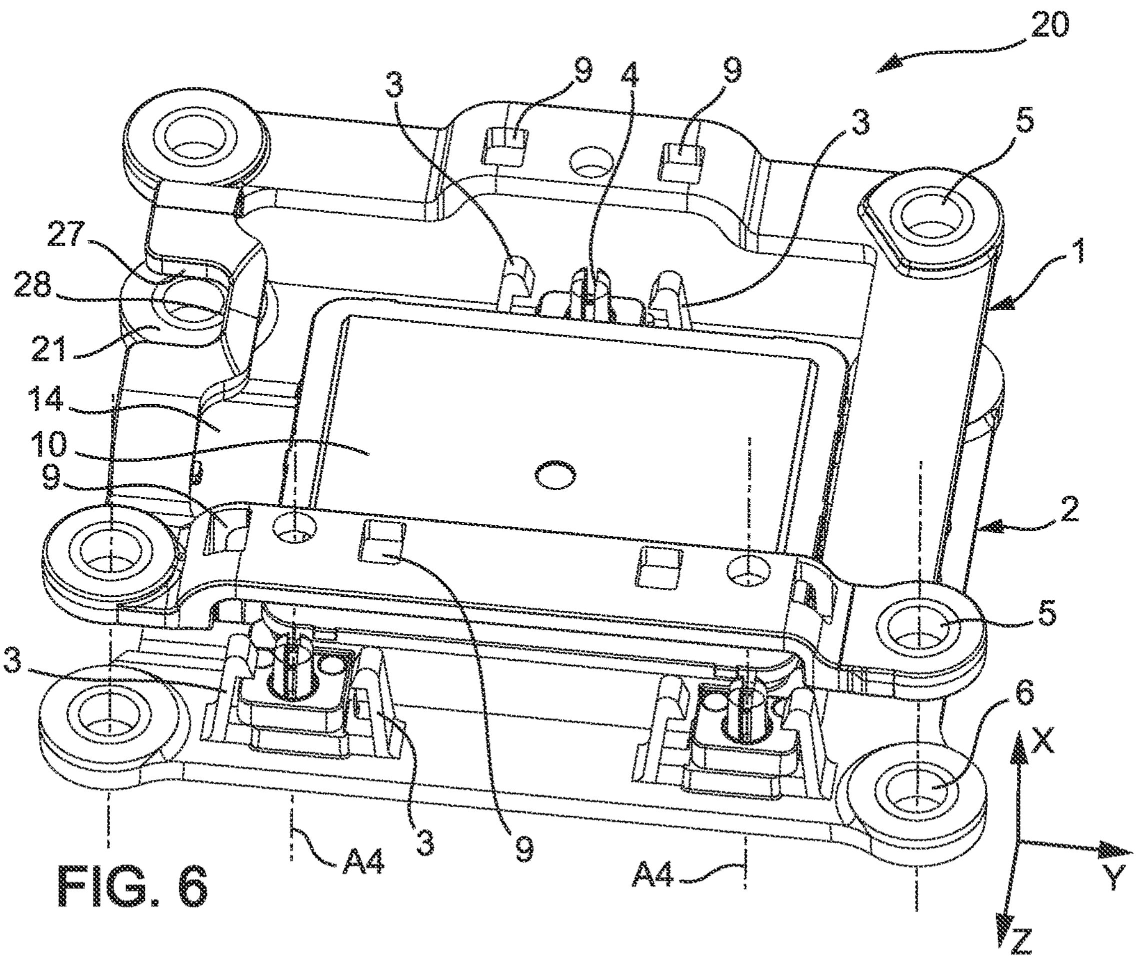
FIG. 6 is another exploded view of the fixing unit of FIG. 4.

As detailed on FIG. 6, the first bracket 1 comprises engagement holes 9 in which the fixing lugs 3 can engage. On this figure, the first bracket 1 is represented spaced apart from the second bracket 2 and the fixing lugs 3 are distant from the engagement holes 9. The insertion of the fixing lugs 3 of the second bracket 2 in the engagement holes 9 of the first bracket 1 generate in a first stage an elastic deflection of the beam 24 of the fixing lugs 3. Once the recessed area 26 of the hook 25 has been pushed far enough to exit the engagement hole 9, the fixing lug 3 springs back and the recessed area 26 of the hook 25 sits flat over the surface of the first bracket 1. At this stage, the fixing lugs 3 are locked, which secures the assembly of the first bracket 1 with the second bracket 2. On FIG. 7 and FIG. 8, the fixing lugs 3 are locked relatively to the first bracket 1. As the hooks 25 are still accessible once the assembly is completed, it is possible to deflect the fixing lugs 3 to unlock them and dismantle the assembly 30.

As detailed on FIG. 8, the retaining pins 4 are configured to pass through the sensing device 10 when the fixing lugs 3 of the second bracket 2 are engaged in the first bracket 1. The retaining pins 4 allow an accurate positioning of the sensing device 10 in the fixing unit 20. The accuracy of the sensing device 10 can be improved, since the tolerance for its location and orientation respectively to the vehicle body can be reduced.

The sensing device 10 comprises a plurality of mounting tabs 11, each mounting tab comprising a hole 12. A retaining pin 4 passes through the hole 12 in each mounting tab 11.

The mounting tabs 11 are sandwiched between the first bracket 1 and the second bracket 2 when the sensing device 10 is fixed in the fixing unit 20. This arrangement is particularly apparent on FIG. 8.

In the illustrated example, the sensing device 10 comprises three mounting tabs 11. The holes 12 of the three mounting tabs 11 form an isosceles triangle. A different number of mounting tabs is possible. The sensing device 10 has a general shape of rectangular cuboid, out of which the mounting tabs 11 extend. Two mounting tabs extend from a same side of the cuboid, and one mounting tab extend from the opposite side of the cuboid shape. A connector 14, for connection to a vehicle harness, extends from a side adjacent to both side from which the mounting tabs 11 extend. The top and bottom faces of the cuboid shape are roughly square, while the side faces are oblong. The mounting tabs 11 extend in a plane parallel to the top face of the cuboid.

The plurality of fixing lugs 3 comprises pairs of fixings lugs, each fixing lug 3*a* of a pair of fixing lugs facing the other fixing lug 3*b* of the pair of fixing lugs. An arrangement with pairs of fixing lugs 3 provides a strong assembly and an easy insertion of the second bracket 2 in the first bracket 1.

As detailed on FIG. 8, the two fixing lugs 3*a*, 3*b* of a pair of fixing lugs 3 are arranged symmetrically with respect to each other. More precisely, the two fixing lugs 3*a*, 3*b* of a pair of fixing lugs are arranged symmetrically with respect to an axis of extension A4 of a retaining pin 4, as illustrated on FIG. 6. The axis of extension A4 of a retaining pin 4 is parallel to the direction of emission D of the radar waves. The axis of extension A4 of a retaining pin 4 is perpendicular to the top face of the cuboid.

A first fixing lug 3*a* of a pair of fixing lugs extends along a first axis A1, a second fixing lug 3*b* of the same pair of fixing lugs extends along a second axis A2, the first axis A1 and the second axis A2 make an angle B comprised between 0° et 10°. This angle is best seen on FIG. 8.

Figure 5:
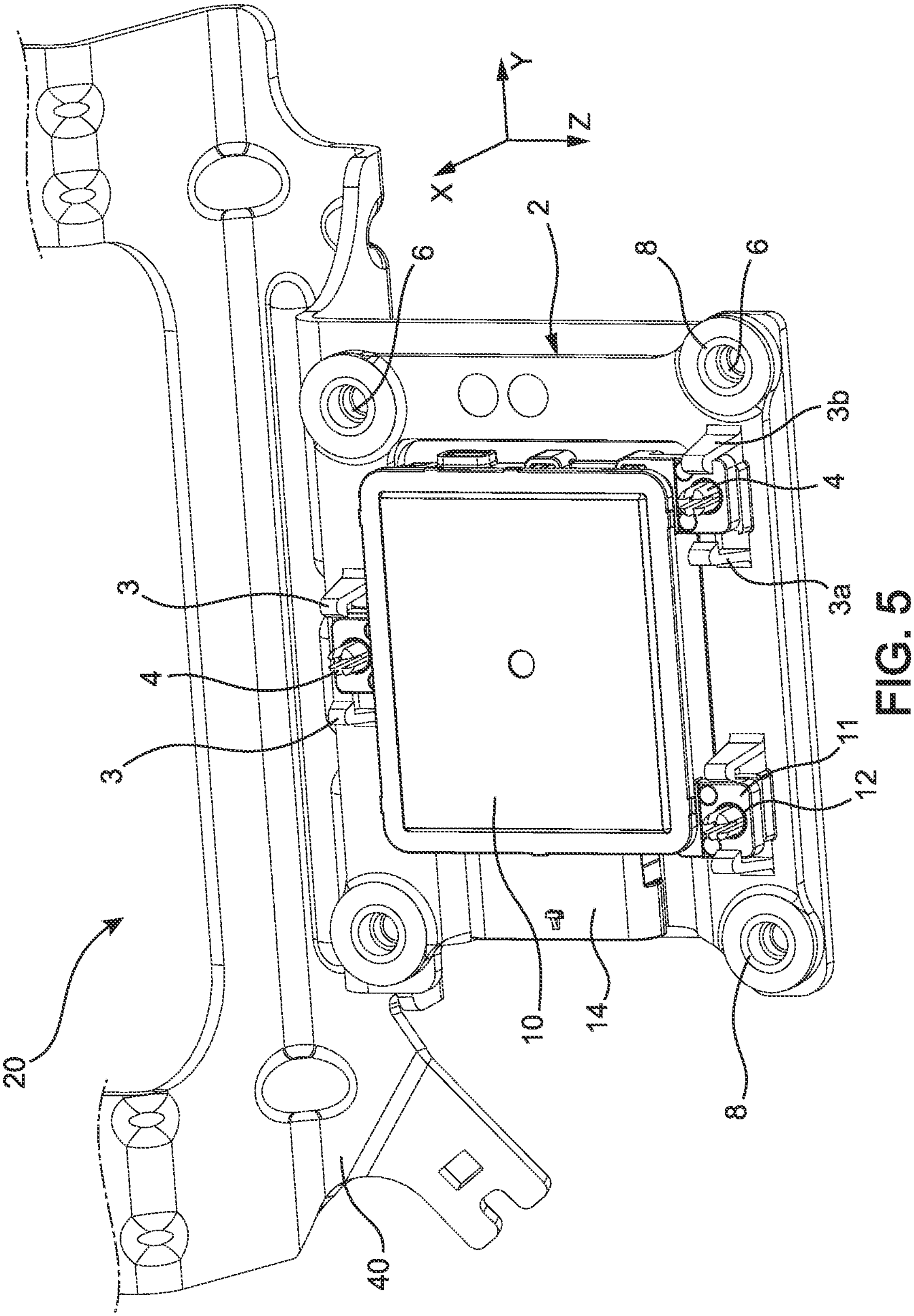
FIG. 5 is a perspective view of a part of the fixing unit of FIG. 4.

A retaining pin 4 is disposed between the two fixing lugs 3*a*, 3*b* of a pair of fixing lugs. The retaining pin 4 secures the sensing device 10 on the second bracket 2 which makes the assembly process easier. FIG. 5 represents the sensing device 10 fitted on the second bracket 2 while the first bracket 1 is not fitted yet. Each mounting tab 11 is fitted between the two fixing lugs 3*a*, 3*b* of a pair of fixing lugs.

On the illustrated example, the only mechanical contact between the sensing device 10 and each bracket 1, 2 takes place through the mounting tabs 11 when the vehicle harness is not plugged in the connector 14. In particular, there is a gap between the internal edges of the brackets and the sides from which the mounting tabs 11 extend.

Figure 3:
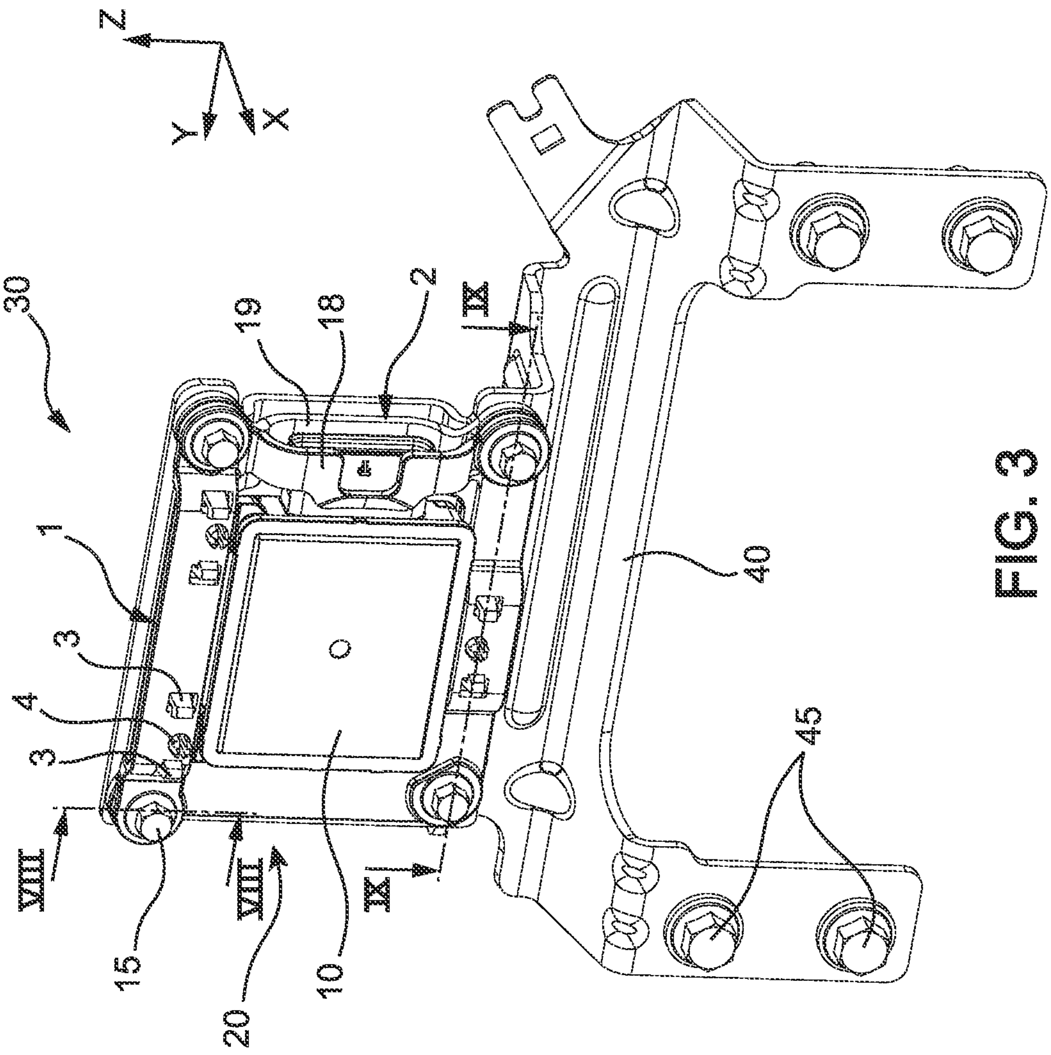
FIG. 3 is another perspective view of the assembly of FIG. 2.

As already described, the fixing unit 20 is configured for being fixed to the industrial vehicle 100. In this illustrated example, the fixing unit 20 is configured for being fixed to a sub-frame 40 of the industrial vehicle 100. The fixing unit 20 is here bolted to a sub-frame 40 of the industrial vehicle 100. FIG. 3 illustrates an assembly 30 of a fixing unit 20, comprising a sensing device 10, on a subframe 40.

The sub-frame 40 of the vehicle can be a metal bracket, for example a sheet metal bracket. The metal bracket can be assembled to a structural element 90 of the industrial vehicle. Fixing screws 45 secure the sub-frame 40 to the structural element 90.

The first bracket 1 comprises a plurality of mounting holes 5 configured for receiving threaded fixing means 15. Similarly, the second bracket 2 comprises a plurality of mounting holes 6 configured for receiving threaded fixing means 15.

The mounting holes 5 of the first bracket 1 are aligned with the mounting holes 6 of the second bracket 2. The mounting holes 5 of the first bracket 1 are coaxial with the mounting holes 6 of the second bracket 2.

As represented on FIG. 3 and FIG. 4, the threaded fixing means 15 may be a set of screws configured for engaging in a subframe 40 of the vehicle.

In another example of implementation, non-represented, the threaded fixing means 15 may be a set of threaded rods engaging into a structural element of the vehicle and configured for receiving a nut.

The first bracket 1 comprises a sleeve 7 bordering a mounting hole 5. Preferably, each mounting hole 5 of the first bracket 1 is bordered by a sleeve 7. The sleeve 7 has a cylindrical shape.

A lateral surface of the sleeve defines the lateral surface of the mounting hole. The internal lateral surface of the sleeve defines the lateral surface of the mounting hole.

Each axial surface of the sleeve 7 defines an axial surface of the mounting hole 5. Each axial end of the sleeve 7 is flush with the first bracket 1.

In an analogous way, the second bracket 2 comprises a sleeve 8 bordering a mounting hole 6. Each mounting hole 6 of the second bracket 2 is here bordered by a sleeve 8.

FIG. 7 represents a cross section detailing the arrangement of the two brackets 1, 2 in the sleeves area. The sleeves 7 of the first bracket 1 are coaxial with the sleeves 8 of the second bracket 2. The dotted line indicates the common axis of the two sleeves 7,8. An axial end of a sleeve 7 of the first bracket 1 is in contact with an axial end of a sleeve 8 of the second bracket 2. The other axial end of the sleeve 7 may be in direct contact with a screw 15, or in contact via a washer spreading the force of the screw over a surface of the first bracket 1. The other axial end of the sleeve 8 is in contact with the subframe 40.

The sleeves 7,8 are axially compressed when the threaded fixation means 15 are torqued. The sleeves 7,8 avoid putting excessive stress in the plastic part of the first bracket 1 and of the second bracket 2.

The sleeves 7, 8 are in metal. For example, the sleeves 7,8 are made of brass.

The sleeves 7,8 may be overmolded as the first bracket 1 and the second bracket 2 are formed by plastic injection.

In the embodiment illustrated here, the retaining pins 4 are split. The retaining pins 4 are configured for being elastically deformed in a radial direction when the sensing device 10 is fixed in the fixing unit 20.

The retaining pins 4 are thus configured for generating a radial constraint against the lateral surface of the holes 12 of the mounting tabs 11 of the sensing device 10. In other words, the external diameter of the retaining pins 4, in a non-constrained state, is larger than the internal diameter of the hole 12 of the mounting tabs 11. Therefore, the retaining pins are deformed when they are fitted in the holes 12 of the mounting tabs 4. As a result, some of the energy of the vibrations received by the sensing device 10 is transferred to the fixing unit 20 through the second bracket 2. Less vibration energy is transmitted to the sensing device 10, which puts less mechanical strain on the components of the sensing device 10. Furthermore, the sensing device 10 is retained to the second bracket 2 by the retaining pin 4 which prevents the parts from coming loose before the first bracket 1 is locked in the second bracket.

Each retaining pin 4 has a general cylindrical shape with a slot 16 passing through the axis the cylinder. In the illustrated example, as detailed on FIG. 9, the retaining pin 4 is split according to two transverse directions. In other words, the retaining pin 4 has a general cylindrical shape with two slots 16, 17 passing each through the axis of the retaining pin 4, with the two slots 16, 17 extending in perpendicular planes.

The first bracket 1 may comprise a first supporting beam 18 for a connector plugged to the sensing device 10. Similarly, the second bracket 2 may comprise a second supporting beam 19 for the connector plugged to the sensing device 10.

The first supporting beam 18 comprises an opening 21 configured for receiving a portion of the connector plugged to the sensing device 10. This connector, not represented on the figures, is part of the vehicle harness. On the illustrated example, the sensing device 10 comprises a male connector 14 and the vehicle harness comprises a female connector. The sides 27,28 of the opening 21 are in contact with the connector. A protrusion of the vehicle harness connector fits snugly in the opening 21. The harness connector is thus held in place, and the risk of accidental unplugging of the connector is eliminated. Furthermore, the stress of the harness weight is relieved from the connector 14.

The second bracket 2 comprises locating pins 13 configured for being inserted in a subframe 40 of the industrial vehicle 100. The locating pins 13 can fit in reception holes 41 of the subframe 40 of the industrial vehicle 100. The locating pins 13 are formed in the second bracket, therefore in the same part as the one comprising the locating pins 4. The number of elements in the stack of dimensions of the relative position of the sensing device 10 relatively to the subframe 40 is reduced, which favors the accuracy of the sensing device 10.

The invention claimed is:

1. A fixing unit for fixing a sensing device to an industrial vehicle, the fixing unit comprising:
- a first bracket; and
- a second bracket comprising:
  - a plurality of fixing lugs configured for snap engagement with the first bracket; and
  - a plurality of retaining pins configured for passing through the sensing device and the first bracket;
  - wherein the sensing device is pressed between the first bracket and the second bracket when the fixing lugs of the second bracket are locked in the first bracket.

2. The fixing unit of claim 1, wherein the sensing device is a radar, or a lidar, or a camera.

3. The fixing unit of claim 1, wherein the retaining pins are configured to pass through the sensing device when the fixing lugs of the second bracket are engaged in the first bracket.

4. The fixing unit of claim 1, wherein the plurality of fixing lugs comprises at least one pair of fixing lugs facing each other.

5. The fixing unit of claim 4, wherein at least one of the plurality of retaining pins is disposed between the two fixing lugs of the plurality of fixing lugs.

6. The fixing unit of claim 5, wherein the two fixing lugs of the plurality of fixing lugs are arranged symmetrically with respect to an axis of extension of the at least one retaining pin of the plurality of retaining pins.

7. The fixing unit of claim 1, wherein the first bracket comprises a plurality of mounting holes configured for receiving threaded fixing means;
- wherein the second bracket comprises a plurality of mounting holes configured for receiving threaded fixing means; and
- wherein the mounting holes of the first bracket are aligned with the mounting holes of the second bracket.

8. The fixing unit of claim 7, wherein each mounting hole of the first bracket is bordered by a metal sleeve; and
- wherein each mounting hole of the second bracket is bordered by a metal sleeve.

9. The fixing unit of claim 1, wherein the retaining pins are split; and
- wherein the retaining pins are configured for being elastically deformed in a radial direction when the sensing device is fixed in the fixing unit.

10. The fixing unit of claim 1, wherein the first bracket comprises a first supporting beam for a vehicle harness.

11. The fixing unit of claim 10, wherein the first supporting beam comprises an opening configured for receiving a portion of the vehicle harness.

12. The fixing unit of claim 1, wherein the second bracket comprises locating pins configured for being inserted in a subframe of the industrial vehicle.

13. An assembly comprising the sensing device and the fixing unit of claim 1.

14. An industrial vehicle comprising the fixing unit of claim 1, wherein:
- the sensing device is fixed to a front part of the industrial vehicle by the fixing unit and in which the sensing device senses the environment of the industrial vehicle.

15. The industrial vehicle of claim 14, wherein the industrial vehicle is a long-haul truck or a porter truck.

16. An industrial vehicle comprising the assembly of claim 13, wherein:
- the sensing device is fixed to a front part of the industrial vehicle by the fixing unit and in which the sensing device senses the environment of the industrial vehicle.

17. The industrial vehicle of claim 16, wherein the industrial vehicle is a long-haul truck or a porter truck.

* * * * *